(12) United States Patent
Bergstrom et al.

(10) Patent No.: US 8,188,031 B2
(45) Date of Patent: May 29, 2012

(54) REUSABLE ANTISTATIC DRYER PRODUCTS AND METHODS FOR FABRICATING THE SAME

(75) Inventors: Joan M. Bergstrom, Phoenix, AZ (US); Tasha Desai, Phoenix, AZ (US)

(73) Assignee: The Dial Corporation, Scottsdale, AZ (US)

( * ) Notice: Subject to any disclaimer, the term of this patent is extended or adjusted under 35 U.S.C. 154(b) by 288 days.

(21) Appl. No.: 12/619,467

(22) Filed: Nov. 16, 2009

(65) Prior Publication Data

US 2011/0118169 A1    May 19, 2011

(51) Int. Cl.
*C11D 7/04* (2006.01)
(52) U.S. Cl. ........................................ 510/519
(58) Field of Classification Search ............ 510/519
See application file for complete search history.

(56) References Cited

U.S. PATENT DOCUMENTS

| | | | |
|---|---|---|---|
| 4,118,525 A | 10/1978 | Jones | |
| 4,642,258 A | 2/1987 | Majewski et al. | |
| 4,659,496 A | 4/1987 | Klemm et al. | |
| 5,375,327 A | * | 12/1994 | Searfoss et al. ............ 29/890.06 |
| 5,814,136 A | 9/1998 | Wood | |
| 6,040,286 A | 3/2000 | Huff | |
| 6,995,122 B2 | 2/2006 | Popplewell et al. | |
| 2001/0020001 A1 | 9/2001 | Zembrodt et al. | |
| 2009/0084732 A1 | 4/2009 | Masters | |

FOREIGN PATENT DOCUMENTS

WO    WO 2007/099109    *    9/2007

OTHER PUBLICATIONS

International Search Report for PCT/US2010/052238 dated Jun. 28, 2011.

* cited by examiner

*Primary Examiner* — John Hardee
(74) *Attorney, Agent, or Firm* — Deborah Henscheid; Thomas Krivulka

(57) ABSTRACT

Dryer products that impart antistatic properties to textiles and methods for fabricating such dryer products are provided. In one exemplary embodiment, a dryer product comprises a water-insoluble, moisture-permeable, enclosed container and a desiccant within the water-insoluble, moisture-permeable, enclosed container. The desiccant is adapted to impart antistatic properties to the textiles during a drying cycle. In another exemplary embodiment, a method for fabricating a reusable antistatic dryer product comprises the steps of providing a desiccant adapted to absorb moisture and be solubilized in the moisture, depositing the desiccant in a water-insoluble, moisture-permeable container, and enclosing the desiccant within the water-insoluble, moisture-permeable container.

15 Claims, 1 Drawing Sheet

REUSABLE ANTISTATIC DRYER PRODUCTS AND METHODS FOR FABRICATING THE SAME

FIELD OF THE INVENTION

The present invention generally relates to textile drying compositions and methods for fabricating textile drying compositions, and more particularly relates to reusable antistatic dryer products and methods for fabricating reusable antistatic dryer products.

BACKGROUND OF THE INVENTION

Antistatic dryer products are commonly used in automated commercial and residential dryers to eliminate static electricity from textiles dried in the dryers. Conventional antistatic laundry products include sheets upon which has been deposited a material that imparts anti-static properties to the textiles, usually by direct contact of the material to the textiles. However, conventional antistatic dryer products suffer from several drawbacks. For example, conventional products typically are only useful for one dryer cycle and then must be discarded. Such limited use of the products results in an undesirable amount of waste of resources and an undesirable accumulation of refuse.

Further, while a conventional antistatic dryer product may be used for more than one dryer cycle by a user attempting to be frugal or environmentally conscious, the dryer product generally does not provide an indication to the user that the product is no longer effective in imparting antistatic properties. Rather, a user who unknowingly uses ineffectual antistatic dryer products may be forced to re-dry the textiles to minimize or eliminate static electricity.

Accordingly, it is desirable to provide a reusable antistatic dryer product. In addition, it is desirable to provide an antistatic dryer product that provides an indication that the product may no longer be effective in imparting antistatic properties to textiles. It also is desirable to provide a method for fabricating such dryer products. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

In accordance with various embodiments of the present invention, dryer products that impart antistatic properties to textiles and methods for fabricating such dryer products are provided. In one exemplary embodiment, a dryer product comprises a water-insoluble, moisture-permeable, enclosed container and a desiccant within the water-insoluble, moisture-permeable, enclosed container. The desiccant is adapted to impart antistatic properties to the textiles during a drying cycle.

In accordance with another exemplary embodiment, a method for fabricating a reusable antistatic dryer product comprises the steps of providing a desiccant adapted to absorb moisture and be solubilized in the moisture, depositing the desiccant in a water-insoluble, moisture-permeable container, and enclosing the desiccant within the water-insoluble, moisture-permeable container.

In yet another exemplary embodiment, a reusable antistatic dryer pouch comprises a water-insoluble, moisture-permeable, enclosed pouch and a desiccant within the water-insoluble, moisture-permeable, enclosed pouch. The desiccant comprises a material selected from the group consisting of hydrated calcium chloride, sodium chloride, potassium chloride, and combinations thereof.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The various embodiments of the present invention relate to dryer products that impart antistatic properties to textiles that are dried in commercial or residential automated laundry dryers. The dryer products comprise a desiccant within a moisture-permeable container. When used in a dryer during a drying cycle, a portion of the desiccant absorbs moisture from the textiles being dried, the moisture in turn solubilizing that portion of the desiccant. In addition to absorbing moisture from the textiles, the dessicant surprisingly eliminates or reduces the static electricity produced during the drying cycle. Upon heating of the dryer, the moisture and the solubilized desiccant evaporate through the moisture-permeable container and leave the dryer. In this regard, as only a portion of the desiccant is evaporated from the container during a drying cycle, the dryer product can be used for subsequent drying cycles until a substantial amount or substantially all the desiccant has been evaporated from the container. A substantially empty container of the dryer product is an indication to a user that the dryer product is no longer effective in imparting antistatic properties to the textiles and can be discarded.

Figure 1:
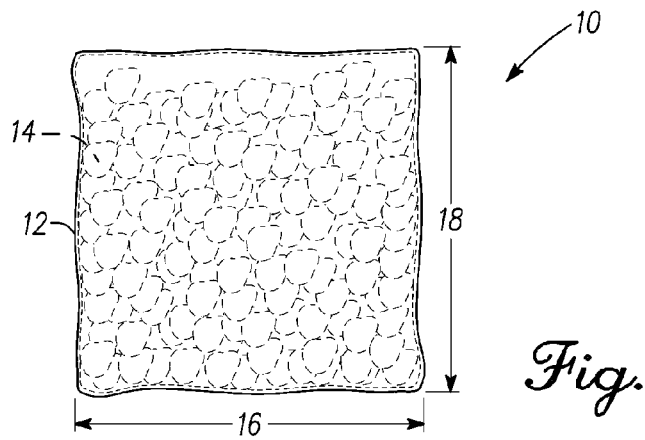
FIG. 1 is a schematic front view of a dryer product that imparts antistatic properties to textiles, in accordance with an exemplary embodiment of the present invention.
Figure 2:
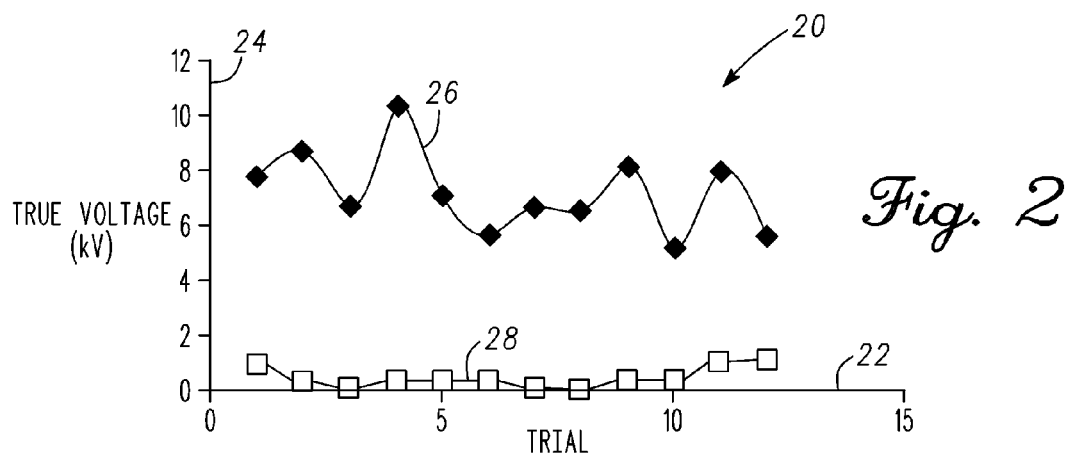
FIG. 2 is a graph illustrating the relationship between static electricity and dryer cycle when no antistatic aid is used and when a dryer product in accordance with an exemplary embodiment of the present invention is used.

FIG. 1 illustrates a dryer product 10 in accordance with an exemplary embodiment of the present invention. The dryer product 10 comprises a desiccant 14 residing within an enclosed container 12. The desiccant can comprise any hygroscopic material that also can impart antistatic properties to textiles. Examples of desiccants 14 suitable for use in the dryer product 10 include hydrated calcium chloride, potassium chloride, sodium chloride, or combinations thereof. In a preferred embodiment, the desiccant comprises 70 to 100 weight percent (wt. %) hydrated calcium chloride. Desiccants comprising less than 100 wt. % hydrated calcium chloride can further comprise potassium chloride, sodium chloride, other dessicants, or combinations thereof. It has been discovered that desiccants comprising at least 70 wt. % hydrated calcium chloride serve not only as desiccants that can absorb moisture and evaporate with the moisture upon the application of heat to the dryer, but surprisingly also impart antistatic properties to textiles. FIG. 2 is a graph 20 illustrating the antistatic properties of a desiccant comprising from about 75-95 wt. % hydrated calcium chloride with the balance sodium chloride and potassium chloride. The x-axis 22 represents twelve dryer cycle trials during which textiles were dried. The y-axis 24 represents the measure of static electricity created during those dryer cycle trials. Plot 26 shows the static electricity created during the drying of textiles without an antistatic dryer product. Plot 28 shows the static electricity created during the drying of textiles using an embodiment of the dryer product contemplated herein. As evident from graph 20, the dryer product resulted in a significant reduction in static electricity produced during all drying cycles.

The desiccant may have any suitable shape or form that permits the desiccant to be deposited within the container, discussed in more detail below, and that also minimizes noise during a drying cycle caused by the dryer product impacting the walls of the rotating dryer drum during cycling. For example, the desiccant may be in the form of a soft solid. However, preferably the desiccant is in the form of flakes, beads, coins, granules, chips, or the like or combinations thereof that provide a large surface area for absorption of moisture from the textiles and for evaporation of the moisture and desiccant from the dryer product.

Referring again to FIG. 1, the container 12 of the dryer product 10 is of dimensions large enough to permit a sufficient amount of desiccant to be stored within the container so that the dryer product can be reused in multiple drying cycles while still remaining effective against static electricity. As used herein, a dryer product 10 is "effective" against static electricity if, after using the dryer product, no more than 10 kilovolts of static electricity is measured from the dryer load. At the same time, the container 12 also is of dimensions small enough so that noise caused during the drying cycle from the dryer product impacting the walls of the rotating dryer drum is minimized. While illustrated in FIG. 1 as square, the container 12 can have any suitable shape, such as rectangular, circular, spherical, or an arbitrary shape and can have any number of sides or surfaces. In one embodiment of the invention, as illustrated in FIG. 1, the dryer product 10 is a square pouch or bag with two facing sides that each has a length, indicated by double-headed arrow 16, of about 76 millimeters (mm) (3 inches), and a width, indicated by double-headed arrow 18, of about 76 mm (3 inches). However, it will be appreciated that the invention is not so limited and the container may have any form and dimensions suitable for a reusable antistatic dryer product.

The container 12 is formed of a flexible, water-insoluble material so that the container does not dissolve or tear upon contact with moisture from the textiles being dried. The container also is thermally stable and is able to withstand the temperatures used in drying cycles of automated laundry dryers (typically no greater than about 140° C. to about 200° C.) without significant shrinking, melting, distortion of shape, or stiffening of the material. The container can be formed of any woven or non-woven, moisture-permeable material that has pores, holes, or other openings that are sufficiently large to permit moisture to enter the container and to evaporate out the container but are sufficiently small so that the unsolubilized desiccant remains within the container before, during, and after a drying cycle. Preferably, the container also is formed of a non-abrasive material that will not abrade, snag, or otherwise cause damage or wear to the textiles being dried. Examples of materials suitable for use include polyethylene, polyester, polypropylene, polyamide, acrylic, nylon, acetate, rayon, paper materials, cellulose materials, non-cellulosic materials, and the like, or combinations thereof. In a preferred embodiment, the container is formed of acetate taffeta.

In an optional exemplary embodiment, the container 12 itself can also be treated so that it imparts a particular property to the textiles being dried. For example, in addition to the desiccant within the container 12, the container may have on or within its fibers, grains, or the like another antistatic product that deposits on the textiles upon contact of the dryer product with the textiles. Alternatively, or in addition, the container 12 can be treated with fabric softener to soften the textiles being dried during a drying cycle, a wrinkle reducer to reduce wrinkling of the textiles, a bleaching agent and/or other stain remover to remove stains that were not removed during a previous washing cycle, and/or an antibacterial, antimicrobial, antiviral, and/or hygienic material such as, for example, silver.

In an exemplary embodiment, the container 12 is filled with a sufficient amount of desiccant so that the dryer product 10 can be used for multiple dryer cycles but does not contain so much desiccant so as to cause significant noise from the dryer product impacting the walls of the rotating dryer drum during cycling. In a preferred embodiment, the container size and the amount of desiccant in the container are such that the life of the dryer product is optimized. For example, it was found experimentally that an acetate taffeta pouch having a length and a width of about 76 mm (3 inches) filled with 50 grams of a desiccant comprising 70-85 wt. % hydrated calcium chloride could be used a total of twelve dryer cycles and still impart antistatic properties, whereas an acetate taffeta pouch having a length of 152 mm (6 inches) and a width of 76 mm (3 inches) filled with 100 grams of the same desiccant could only be used a total of eight dryer cycles before the dryer product was ineffectual. As noted above, a dryer product 10 is "ineffective" against static electricity if, after using the dryer product, more than 10 kilovolts of static electricity is measured from the dryer load. Preferably, the size of the container 12 and the amount of desiccant 14 in the container are of a ratio that permits the dryer product 10 to be used for at least ten dryer cycles before the product becomes measurably ineffective against static electricity.

In another, optional, exemplary embodiment, the dryer product 10 also comprises a fragrance component (not shown) that imparts a fragrance to the textiles being dried during drying cycles. In this regard, in addition to the desiccant, the container 12 may contain fragrance beads, fragrance flakes, encapsulated fragrances, or the like that can impart a fragrance to the textiles upon evaporation or sublimation during a dryer cycle. Alternatively, or in addition, the container may be treated with a fragrance that deposits on the textiles being dried upon contact of the dryer product with the textiles. It will be appreciated that other means for imparting fragrance to the textiles also can be used. For example, the fragrance can be sprayed on the dryer product by a user before the dryer product is placed in a dryer. In this regard, the user can control the amount of fragrance that is deposited on the textiles during drying. In one embodiment, the dryer product 10 may comprise enough fragrance to last the life of the product so that a substantial lack of fragrance indicates to a user that the dryer product has exceeded its lifespan and should be replaced by a new dryer product.

Figure 3:
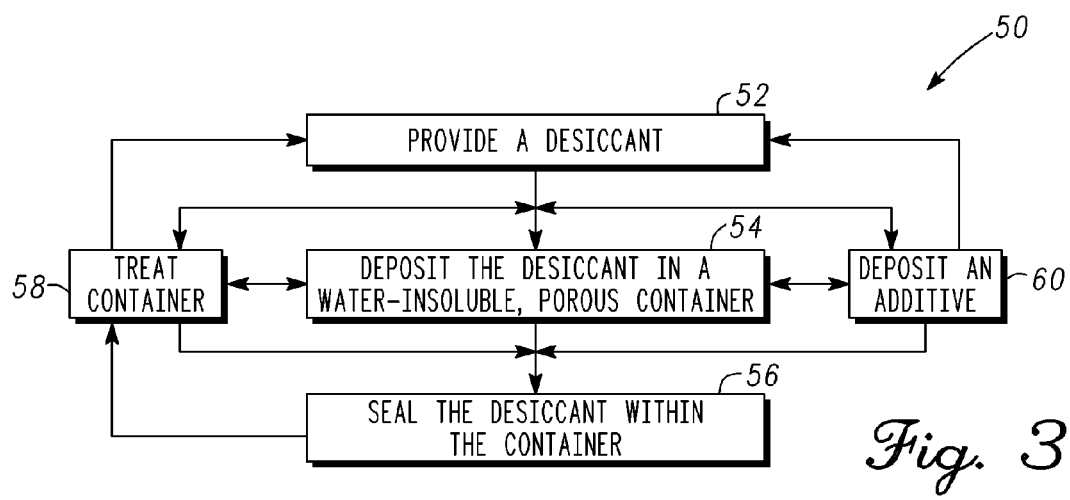
FIG. 3 is a flow chart of a method for fabricating a dryer product that imparts antistatic properties to textiles, in accordance with an exemplary embodiment of the present in invention.

FIG. 3 is a flowchart of a method 50 for fabricating a reusable antistatic dryer product in accordance with an exemplary embodiment of the present invention. The method begins by providing a desiccant (step 52). Any of the desiccants described above with reference to FIG. 1 can be used. In a preferred embodiment, the desiccant comprises 70-100 wt.

% hydrated calcium chloride with any remaining portion comprising sodium chloride and potassium chloride. In another preferred embodiment, the desiccant is in the form of flakes, granules, chips, beads, or the like.

The desiccant then is deposited through an opening in a flexible, water-insoluble, moisture permeable container having any suitable size and shape as described above (step 54). Preferably, the container is in the form of a square with three sealed and/or integral sides, thus forming a pouch suitable for receiving the desiccant through the opening. In an exemplary embodiment, the container is filled with a sufficient amount of desiccant so that the dryer product can be used for multiple dryer cycles but is not filled with so much desiccant that the dryer product causes significant noise during the drying cycles from the dryer product impacting the walls of the rotating dryer drum. In a preferred embodiment, the container is filled with a sufficient amount of desiccant so that the dryer product can be used in at least ten dryer cycles before becoming ineffective against static electricity. Before, during, or after depositing the desiccant in the container, other additives, such as, for example, fragrance-delivering devices, fabric softeners, wrinkle reducers, bleaching agents, stain removers, and/or antibacterial, antimicrobial, antiviral, and/or hygienic materials can be deposited within the container (step 60). Next, the desiccant is sealed or otherwise enclosed within the container (step 56). The opening of the container can be sealed by any suitable mechanism, such as by sewing the opening closed, gluing the opening closed, melting the opening closed, such as by ultrasonic means, and the like.

In an optional embodiment, before, during, or after depositing the desiccant in the container, the container itself can be treated so that the dryer product imparts additional antistatic properties and/or other properties to the textiles being dried (step 58). For example, the container may be treated with other antistatic components, and/or fabric softening agents, wrinkle reducers, fragrance, bleaching agents, stain removers, and/or antibacterial, antimicrobial, antiviral, and/or hygienic materials and the like, or combinations thereof.

Accordingly, various embodiments of a dryer product that imparts antistatic properties to textiles that are dried in commercial or residential automated laundry dryers have been provided. The dryer product comprises a desiccant within a water-insoluble, moisture-permeable container. In addition to absorbing moisture from the textiles, the dessicant surprisingly eliminates or reduces the static electricity produced during the drying cycle. When used in a dryer during a drying cycle, a portion of the desiccant absorbs moisture from the textiles and evaporates from the container. In this regard, as only a portion of the desiccant is evaporated during a drying cycle, the dryer product can be used for subsequent drying cycles until a substantial amount or substantially all of desiccant has been evaporated from the product. A substantially empty container of the dryer product is an indication to a user that the dryer product is no longer effective in imparting antistatic properties to the textiles and can be discarded.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A dryer product that imparts antistatic properties to textiles, the dryer product comprising:
    a water-insoluble, moisture-permeable, enclosed container, adapted to be removably placed within the drum of a dryer for contacting with the textiles during a drying cycle; and
    a compound within the water-insoluble, moisture-permeable, enclosed container, wherein the compound comprises a material that is:
        a) a desiccant adapted to absorb moisture from textiles during the drying cycle;
        b) an antistatic agent adapted to impart antistatic properties to the textiles during a drying cycle upon contact with the textiles during the drying cycle; and
        c) a material that, after absorbing moisture from the textiles during the drying cycle, solubilizes and evaporates from the water-insoluble, moisture-permeable, enclosed container upon application of heat to the container during the drying cycle,
    wherein the water-insoluble, moisture-permeable, enclosed container contains a sufficient amount of the compound such that the dryer product can be used for more than one drying cycle while still imparting antistatic properties to the textiles being dried so that static electricity produced during each of the more than one drying cycle is no more than 10 kilovolts.

2. The dryer product of claim 1, wherein the compound comprises a material selected from the group consisting of hydrated calcium chloride, potassium chloride, sodium chloride, and combinations thereof.

3. The dryer product of claim 2, wherein the compound comprises about 70 to about 100 wt. % hydrated calcium chloride.

4. The dryer product of claim 1, wherein the compound is in the form of granules, beads, flakes, coins, chips, or a combination thereof.

5. The dryer product of claim 1, wherein the water-insoluble, moisture-permeable, enclosed container is comprised of a material selected from the group consisting of polyethylene, polyester, polypropylene, polyamides, acrylic, nylon, acetate, rayon, paper materials, cellulose materials, non-cellulosic materials, and combinations thereof.

6. The dryer product of claim 1, wherein the water-insoluble, moisture-permeable, enclosed container comprises acetate taffeta.

7. The dryer product of claim 1, wherein the water-insoluble, moisture-permeable, enclosed container is treated with an antistatic component, a fabric softening agent, a wrinkle reducer, fragrance, bleaching agents, stain removers, antibacterial materials, antimicrobial materials, antiviral materials, hygienic materials, or a combination thereof.

8. The dryer product of claim 1, further comprising an additional antistatic component, a fabric softening agent, a wrinkle reducer, fragrance, a bleaching agent, a stain remover, an antimicrobial material, an antibacterial material, an antiviral material, a hygienic material, or a combination thereof within the water-insoluble, moisture-permeable, enclosed container.

9. A method for fabricating a reusable dryer product adapted to impart anti-static properties to textiles during a drying cycle, the method comprising the steps of:
    providing a compound that comprises a material that is:
        a) a desiccant adapted to absorb moisture from the textiles during the drying cycle;

b) an antistatic agent adapted to impart antistatic properties to the textiles during a drying cycle upon contact with the textiles during the drying cycle; and c) a material that is adapted to be solubilized after absorbing the moisture from the textiles during the drying cycle and evaporated upon application of heat during the drying cycle;

depositing the compound in a water-insoluble, moisture-permeable container, the water-insoluble, moisture-permeable container being adapted for removable placement within the drum of a dryer for contacting the textiles during a drying cycle; and enclosing the compound within the water-insoluble, moisture-permeable container, in an amount such that the dryer product can be used for more than one drying cycle while still imparting antistatic properties to the textiles being dried so that static electricity produced during each of the more than one drying cycle is no more than 10 kilovolts.

10. The method of claim 9, wherein the step of providing a compound comprises providing a compound comprising a material selected from the group consisting of hydrated calcium chloride, potassium chloride, sodium chloride, and combinations thereof.

11. The method of claim 10, wherein the step of providing a compound comprises providing a compound comprising about 70 to about 100 wt. % hydrated calcium chloride.

12. The method of claim 9, wherein the step of depositing comprises depositing the compound in a water-insoluble, moisture-permeable container comprising a material selected from the group consisting of polyethylene, polyester, polypropylene, polyamides, acrylic, nylon, acetate, rayon, paper materials, cellulose materials, non-cellulosic materials, and combinations thereof.

13. The method of claim 9, wherein the step of depositing comprises depositing the compound in a water-insoluble, moisture-permeable container comprising acetate taffeta.

14. The method of claim 9, further comprising the step of treating the water-insoluble, moisture-permeable container with an antistatic component, a fabric softener, a wrinkle reducer, a fragrance, a bleaching agent, a stain removing agent, an antimicrobial material, an antibacterial material, an antiviral material, a hygienic material, or a combination thereof.

15. The method of claim 9, further comprising the step of depositing an additional antistatic component, a fabric softening agent, a wrinkle reducer, fragrance, a bleaching agent, a stain remover, an antimicrobial material, an antibacterial material, an antiviral material, a hygienic material or a combination thereof within the water-insoluble, moisture-permeable container.

* * * * *